United States Patent [19]
Margalit et al.

[11] 4,160,070
[45] Jul. 3, 1979

[54] ADDITIVE FOR HIGH DRAIN RATE LITHIUM CELLS

[75] Inventors: Nehemiah Margalit, Levittown; Philip E. Krouse, Yardley, both of Pa.

[73] Assignee: ESB United States, Inc., Philadelphia, Pa.

[21] Appl. No.: 945,414

[22] Filed: Sep. 25, 1978

[51] Int. Cl.² .............................................. H01M 6/14
[52] U.S. Cl. ................................... 429/194; 429/201; 429/203
[58] Field of Search ........................ 429/194, 197–199, 429/201, 203, 188

[56] References Cited
U.S. PATENT DOCUMENTS

| | | | |
|---|---|---|---|
| 3,413,154 | 11/1968 | Rao | 429/194 |
| 3,887,397 | 6/1975 | Horning | 429/194 |
| 3,945,848 | 3/1976 | Dey et al. | 429/198 |
| 3,997,362 | 12/1976 | Eustace et al. | 429/194 |
| 4,079,174 | 3/1978 | Beck et al. | 429/198 |

*Primary Examiner*—Anthony Skapars
*Attorney, Agent, or Firm*—Gilbert W. Rudman; Ewan MacQueen

[57] ABSTRACT

An improved high drain rate lithium cell is provided. The improvement is the use of an additive to stabilize the cell. The additive is a minor porton of a tetra alkyl onium salt.

10 Claims, No Drawings

ADDITIVE FOR HIGH DRAIN RATE LITHIUM CELLS

BACKGROUND OF THE INVENTION

1. Field of the Invention

This invention relates to an additive for non-aqueous electrolyte of a high rate lithium electrochemical cell. More particularly, it relates to the use of tetra alkyl onium salts.

2. Prior Art

It has been known for some time that high rate drain cells having anodes of lithium and electrolyte of solvent and solute are not stable, particularly at high temperatures.

The instability problem is three fold. First, there is a short discharge life after storage due to apparent chemical changes in the electrolyte; secondly, there is a pressure build-up because of detrimental side reactions in the electrolyte; and thirdly, there are cell degradation reactions among cell components. Yet these same unstable electrolyte systems for lithium batteries produce extremely high energy due to high conductivity of the solute in the solvent.

In lithium cells, cell degradation reactions can be manifested in various ways: crust formation on the anode, e.g., with $SOCl_2$ solutions; gas formation and cell rupture, e.g., with lithium hexafluoroarsenate in methylformate, and polymerization of solvent, e.g., in THF solutions. In all three type degradations, the reaction leads to decreased performance, if not complete failure, of the cell. When using non-aqueous solvents in the electrolyte, both gassing and formation of viscous, if not solid, reaction products near the anode are of major concern; stable or stabilized electrolyte has to be used in lithium cells.

There are many applications, e.g., watch, camera, etc., for which batteries must be constructed in a shape requiring high conductivity to permit efficient and economical utilization of the chemicals. Design limitations require utilization of highly conductive electrolytes. However, conditions of use require electrolytes capable of long term storage.

In U.S. Pat. No. 3,887,397, issued June 3, 1975, to Robert J. Horning, it is disclosed that in lithium cells having a highly conductive methylformate/lithium hexafluoroarsenate electrolyte, the addition of small amounts of lithium tetrafluoroborate will significantly improve the stability of the cell. Thus by using lithium tetrafluoroborate as a stabilizer, Horning succeeded in practically eliminating the gassing reaction between lithium and the specific electrolyte.

However, no mention is made in the patent of any other salts which could be utilized or of any ability to control non-gassing reactions causing deposition of reddish-brown viscous products on and near the lithium. Such viscous deposits will hinder the performance of the anode after prolonged storage and/or at higher rates by slowing ionic mobility near the anode.

It is the objective of this invention to provide a method of stabilizing non-aqueous lithium batteries in terms of reducing chemical interactions between the electrolyte and cell components.

A more particular object of this invention is to provide stabilizing additives for high rate lithium cells so that gassing and other reaction product formations are not observed.

SUMMARY OF THE INVENTION

It has been discovered that the stability of high rate batteries which contain a lithium anode, an electrolyte having a solvent and solute and a cathode will be significantly improved by the addition to the electrolyte of a tetra alkyl onium salt.

DETAILED DESCRIPTION OF THE INVENTION

The cathode can be any cathodic material which is inert to the electrolyte, among these are $V_2O_5$, $Ag_2CrO_4$, $(CF)_n$, $MnO_2$, $CuS$ and others which are known to those skilled in the art. As stated above, this invention relates basically to stabilizing of the electrolyte and anode, hence, does not require any particular cathode for use.

The solvents of the electrolyte used in the current invention are those which are known for use in high rate cells. Examples include methylformate, gamma-butyrolactone, 1,2-dimethoxyethane and 1,3-dioxolane, and mixtures thereof.

The solutes which are dissolved in the solvents to form the electrolyte are also known to those skilled in the art. Examples include the hexafluoroarsenates, the trifluoromethylsulfonates and the perchlorates. It is preferred that the salt of these cations be the lithium salt.

The tetra alkyl onium salts are used in the current invention. The preferred onium salts have the formula:

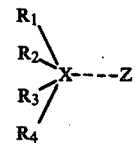

wherein
$R_1$–$R_4$ are alkyl groups of 4 or less carbons, the alkyl groups can be the same or different.
X is ammonium or phosphonium and
Z is an anion of an acid compatable with the lithium cell.

The compatable anions include: tetrafluoroborate ($BF_4^-$), hexafluorophosphate ($PF_6^-$), phosphate ($PO_4^{-3}$), borate ($BO_3^-$), diborate ($B_2O_7^-$), sulfate ($SO_4^{-2}$), sulfite ($SO_3^{-2}$), and tri-fluoromethyl sulfonate ($SO_3CF_3^-$).

The amount of the tetra alkyl onium salt which should be employed vary depending upon the stability desired. Normally, the amount of tetra alkyl onium salt will range from approximately 0.01 molar to as much as 0.8 molar in the electrolyte. A more preferred range is about from 0.01 to 0.1 molar percent.

The current inventors have found that the use of these tetra alkyl onium salts not only stops the gas reaction but also decreases and practically eliminates the non-gassing side reactions. For example, in the case of lithium hexafluoroarsenate in methylformate with lithium tetrafluoroborate or no additives, these side reactions produce a reddish-brown viscose product that clings to the lithium. This product will effect the high rate performance of cells by slowing ionic mobility near the anode. The current inventors have found that even in highly reactive lithium hexafluoroarsenate in methylformate electrolyte, the elimination of the side reaction is increased if one uses a tetra alkyl onium salt.

EXAMPLE 1

Strips of lithium were placed in three heavy glass tubes each having a different electrolyte solution. The tubes were part of an apparatus used to measure the gassing and observe corrosion on the lithium. The apparatus consisted of a heavy glass tube (Fischer and Porter Co., Aerosol Reaction Vessel, No. 110-205) connected to an Bourdon gauge (−30 to 150 inches mercury, U.S. Gauge No. 5060). The seal between the gas vessel and tube leading to the gauge was made with a stainless steel adapter plug fitted with a silicone rubber "O" ring.

The sealed apparatus was placed into an oven at 165° F. and monitored daily for gassing and for impurity formation on the lithium. The experiments were continued until there was a significant increase in the pressure within the test tubes of 1 to 1 ½ atmospheres of pressure over the pressure of equilibrium at 165° F. or until they extended over a period of time in which a significant difference could be seen in the additives.

In all the tests the solvent was methylformate and the solute was 2.5 molar $LiAsF_6$. The electrolyte differed only by additive. The results were as follows:

| Additive | Hours Until Significant Pressure Build Up | Visual Inspection Of Lithium |
| --- | --- | --- |
| None | 560 | Substantial Amount Of Viscous Material |
| 0.1M $(CH_3)_4NPF_6$ | Greater Than 975* | Substantially Free of Viscous Material |
| 0.3M $(CH_3)_4NPF_6$ | Greater Than 594** | Substantially Free of Viscous Material |

*The test was deliberately terminated at this point in order to free the apparatus for other use.
**The test was ended at this point because the apparatus was cracking.

EXAMPLE 2

Strips of lithium were placed in seven heavy glass tubes each having a different electrolyte solution. The apparatus used and the testing procedure was as in Example 1.

In all the tests the solvent was methylformate and the solute was 2.0 molar $LiAsF_6$. The electrolyte differed only by additive. The results were as follows:

| Additive | Hours Until Significant Pressure Build Up |
| --- | --- |
| None | 52 |
| 0.1M $(CH_3)_4NBF_4$ | More Than 114* |
| 0.2M $(CH_3)_4NBF_4$ | More Than 291* |
| None | 18 |
| 0.1M $(CH_3)_4NBF_4$ | More Than 522* |
| 0.1M $(CH_3)_4NBF_4$ | More Than 522* |
| 0.2M $(CH_3)_4NBF_4$ | More Than 522* |

*The test was deliberately terminated at this point.

We claim:

1. An improvement in a high rate electrochemical cell having a lithium anode, a non-aqueous electrolyte comprised of a solvent and solute and a cathode, the improvement comprising having as an additive a minor portion of a tetra alkyl onium salt dissolved in the electrolyte.

2. The cell of claim 1 wherein the onium salt has the formula

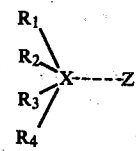

wherein $R_1$–$R_4$ are alkyl groups of four or less carbons, X is ammonium or phosphonium and Z is an onium of an acid compatable with the lithium salt.

3. The cell of claim 2 wherein $R_1$–$R_4$ is methyl.

4. The cell of claim 2 wherein Z is tetrafluoroborate, hexafluorophosphate, phosphate, borate, diborate, sulfate, sulfite, sulfide, or trifluoromethyl sulfonate.

5. The cell of claim 1 wherein the additive is tetramethyl ammonium hexafluorophosphate or tetramethyl ammonium tetrafluoroborate.

6. The cell of claim 1 wherein the amount of onium salt is 0.01–0.8 molar.

7. The cell of claim 1 wherein the amount of onium salt is 0.01–0.1 molar.

8. The cell of claim 1 wherein the electrolyte is methylformate, gamma-butyrolactone, 1,2-dimethoxyethane, 1,3-dioxolane or mixtures thereof.

9. The cell of claim 1 wherein the solvent is methylformate.

10. The cell of claim 1 wherein the solute is lithium hexafluoroarsenate, lithium trifluoromethylsulfonate or lithium perchlorate.

* * * * *